United States Patent Office 3,162,670
Patented Dec. 22, 1964

3,162,670
DIALKYL HYDROCARBONTHIOPHOSPHONOXY-HYDROXYHEXAHYDROPHTHALATE
James M. Petersen, Fishkill, and David D. Reed, Glenham, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,650
4 Claims. (Cl. 260—461)

This invention relates to the novel reaction product of dialkyl epoxyhexahydrophthalate and hydrocarbonthiophosphonic acid. More particularly, the subject invention pertains to dialkyl hydrocarbonthiophosphonoxyhydroxyhexahydrophthalate and to its method of manufacture.

The dialkyl hydrocarbonthiophosphonoxyhydroxyhexahydrophthalates of this invention, hereafter known for the sake of brevity as the hexahydrophthalate derivatives, are represented by the formula:

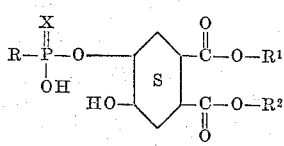

wherein R is a monovalent hydrocarbon derived radical (hydrocarbyl), $R^1$ and $R^2$ are alkyl of from 1 to 20 carbons, and X is sulfur or a mixture of sulfur and oxygen.

The hexahydrophthalate derivatives of this invention are useful as thermal stability additives for fuels such as jet fuels.

Broadly, the hexahydrophthalate derivatives are prepared by the reaction of hydrocarbonthiophosphonic acid and dialkyl epoxyhexahydrophthalate at an elevated temperature.

PREPARATION OF THE HYDROCARBONTHIOPHOSPHONIC ACID REACTANT

The preparation of the hydrocarbonthiophosphonic acid is described in co-assigned, co-pending applications Serial No. 59,505, now Pat. No. 3,087,956 filed September 30, 1960 and Serial No. 63,973, now Pat. No. 3,123,630 filed October 21, 1960.

The hydrocarbonthiophosphonic acid is prepared by reacting a hydrocarbon with $P_2S_5$ ($P_2S_5$ about 5–40 wt. percent of reaction mass) at a temperature of from about 100–320° C. in an inert atmosphere, for example, under a blanket of nitrogen. The $P_2S_5$-hydrocarbon reaction product is then hydrolyzed to thiophosphonic acid by treating said reaction product with steam at a temperature of about 100 and 260° C. The hydrocarbonthiophosphonic formed has the general formula:

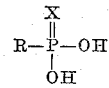

where R is a hydrocarbyl derived from the hydrocarbon reacted with the $P_2S_5$ and desirably is a mono-olefinic radical containing 20 to 200 carbon atoms. X is defined as sulfur or a mixture of sulfur and oxygen. The reason X is designated as sulfur or a mixture of sulfur and oxygen is because the steam hydrolysis step in the conversion of the hydrocarbon-$P_2S_5$ product to thiophosphonic acid usually results in the replacement of a portion of the sulfur joined to the phosphorus with oxygen.

Inorganic phosphorus acids are formed during the hydrolysis of the hydrocarbon-$P_2S_5$ product to thiophosphonic acid and these inorganic phosphorus acids are desirably removed prior to the reaction of the thiophosphonic acid with the hexahydrophthalate reactant. The inorganic acids can be eliminated by a number of different procedures. One procedure is described in U.S. Patent Nos. 2,951,835 and 2,987,521 wherein the removal of phosphorus acid is affected by contact with synthetic hydrous alkaline earth metal silicates and synthetic hydrous alkali metal silicates, respectively. Commonly assigned co-pending application, Serial No. 841,668 filed September 23, 1959 by H. D. Kluge and R. G. Lacoste describes a process wherein inorganic phosphorus acids are removed from the hydrolyzed product by extraction with anhydrous methanol.

The hydrocarbon utilized in the reaction with $P_2S_5$ from which the R values in the foregoing formulas are derived can be aromatic, cycloaliphatic, aliphatic substituted aryl compounds and aryl substituted aliphatic compounds. Olefins, however, are one of the more desirable hydrocarbon materials. The olefinic hydrocarbons reacted with $P_2S_5$ usually contain at least 12 carbon atoms although a lower molecular weight olefin can be employed. Mono-olefinic polymers such as polyisobutene, polybutene, polypropylene and copolymers of mono-olefins such as the propylene-isobutene copolymer are specific examples of desirable olefins. In general, mono-olefinic polymers and copolymers having an average molecular weight between about 250 and 50,000 are employed as a hydrocarbon reactant with polymers and copolymers having an average molecular weight in the range of 600 to 5,000 being particularly preferred. A particularly preferred olefin polymer is polybutene having an average molecular weight between 600 and 5,000.

Specific examples of the hydrocarbonthiophosphonic acid reactants contemplated herein are polybutene (940 m.w.) thiophosphonic acid, polyisobutene (1200 m.w.) thiophosphonic acid, and propylene-butylene copolymer (1500 m.w.) thiophosphonic acid.

DIALKYL EPOXYHEXAHYDROPHTHALATE REACTANT

The dialkyl epoxyhexahydrophthalate reactant contemplated herein is of the general formula:

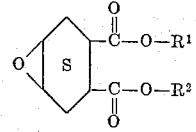

where $R^1$ and $R^2$ are the same or different alkyl radicals of from 1 to 20 carbons. Specific examples of the dialkyl epoxyhexahydrophthalates contemplated herein are diisodecyl 4,5-epoxyhexathydrophthalate, dihexyl 4,5-epoxyhexahydrophthalate, dibutyl 4,5-epoxyhexahydrophthalate, and butyl isodecyl 4,5-epoxyhexahydrophthalate.

PREPARATION OF THE HEXAHYDROPHTHALATE DERIVATIVES

The hexahydrophthalate derivatives are prepared by contacting the thiophosphonic acid with dialkyl epoxyhexahydrophthalate, at a temperature between about 25 and 150° C. The reactant mole ratio of thiophosphonic acid to hexahydrophthalate is advantageously between about 0.1:1 and 2:1. Although superatmospheric and subatmospheric pressures may be employed, atmospheric pressure is normally utilized. The reaction is usually conducted for a period of 1 to 2 hours.

At the end of the reaction period the hexahydrophthalate derivative can be purified by standard means such as clay contacting and contacting with an ion exchange resin.

Specific examples of the hexahydrophthalate derivatives contemplated herein are diisodecyl 4-polybutene (940 m.w.) thiophosphonxy-5-hydroxyhexahydrophthalate, dioctyl 4-polypropylene(2500 m.w.)-5-hydroxyhexahydrophthalate, and pentyl decyl 4-polyisobutylene(1500 m.w.)thiophosphonoxy-5-hydroxyhexahydrophthalate.

Example I below illustrates the preparation of the hydrocarbonthiophosphonic acid reactants. Example II illustrates the preparation of an example of the hexahydrophthalate derivatives contemplated herein.

*Example I*

A polybutene-$P_2S_5$ reaction product was prepared by reacting polybutene having an average molecular weight of about 940, with $P_2S_5$ at a temperature of about 232° C. in a mole ratio of polybutene to $P_2S_5$ of 1.1:1 and in the presence of sulfur in an amount equal to 3 wt. percent of polybutene for a period of 10 hours. The reaction product was diluted with approximately 150 wt. percent of naphthene base oil having an SUS viscosity at 100° F. of 100, then steamed at 176° C. for 10 hours in a nitrogen atmosphere and then dried by the passage of nitrogen therethrough at 176° C. The hydrolyzed product was extracted with 50% by volume of methyl alcohol at 55° C. to get a methanol extract containing inorganic phosphorus acids and a lubricating oil raffinate containing hydrocarbonthiophosphonic acid of the formula:

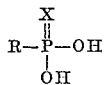

where R is a polybutene derived radical (mono-olefinic) having an average molecular weight of 940, and X is a mixture of sulfur and oxygen. The oil solution of thiophosphonic acid was analyzed for sulfur and found to have a sulfur content of 0.5 wt. percent. If X was entirely sulfur, the sulfur content in the thiophosphonic acid solution would be 1.1 wt. percent. This indicates that X is a mixture of sulfur and oxygen.

*Example II*

248 grams of the oil solution of the thiophosphonic acid as in Example I containing 0.1 mole polybutene (940 m.w.)thiophosphonic acid was charged to a 1 liter, 3-neck flask equipped with a stirrer, thermometer and gas inlet tube. Stirring was begun and the mixture was heated to 93° C. whereupon 56.6 grams (0.122 mole) diisodecyl 4,5-epoxyhexahydrophthalate were added. Stirring and heating at 93° C. was continued for a 2 hour period. At the end of the reaction, the reaction mixture was purified by stripping with nitrogen at a temperature of 93° C. under a mercury pressure of 1-2 mm. Hg. The oil residue was shown by analysis to contain diisodecyl 4-hydrocarbonthiophosphonoxy - 5 - hydroxyhexahydrophthalate of the formula:

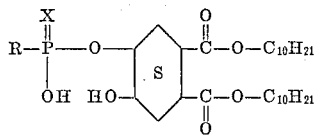

where R is a polybutene derived radical (mono-olefinic) having an average molecular weight of 940 and X is a mixture of sulfur and oxygen. The product analyzed as follows:

| Description | Calculated | Found |
|---|---|---|
| Phosphorus, wt. percent | 1.02 | 0.92 |
| Hydroxyl No | 22.4 | 19 |
| Neut. No | 0 | 0.7 |
| Mole ratio, hexahydrophthalate/thiophosphonic acid reactant in product | 1 | 1.22 |

We claim:
1. A hydroxyhexahydrophthalate derivative of the formula:

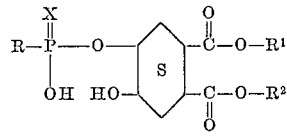

where R is a hydrocarbyl derived from an aliphatic polyolefin having a molecular weight between 250 and 50,000, $R^1$ and $R^2$ are alkyl of from 1 to 20 carbons, and X is a chalcogen selected from the group consisting of sulfur and a mixture consisting of a major portion of sulfur and a minor portion of oxygen.

2. A derivative in accordance with Claim 1 wherein R is a polybutene of an average molecular weight of between 940, $R^1$ and $R^2$ are isodecyl, and X is a mixture consisting of a major portion of sulfur and a minor portion of oxygen.

3. A method of preparing a hydroxyhexahydrophthalate of the formula:

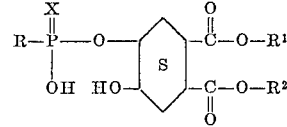

where R is a hydrocarbyl derived from an aliphatic polyolefin having a molecular weight between 250 and 50,000, $R^1$ and $R^2$ are alkyl of from 1 to 20 carbons, and X is a chalcogen selected from the group consisting of sulfur and a mixture consisting of a major portion of sulfur and a minor portion of oxygen comprising contacting a thiophosphonic acid of the formula:

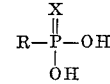

with a dialkyl epoxyhexahydrophthalate of the formula:

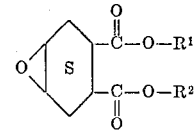

where $R^1, R^2$, and X are as heretofore defined, at a temperature between about 25 and 150° C. in a mole ratio of said thiophosphonic acid to hydrophthalate reactant of between 0.1:1 and 2:1.

4. A method in accordance with claim 3 wherein R is a polybutene having an average molecular weight of 940, $R^1$ and $R^2$ are isodecyl, and X is a mixture consisting of a major portion of sulfur and a minor portion of oxygen.

No references cited.